United States Patent Office 3,528,988
Patented Sept. 15, 1970

3,528,988
METHOD FOR MAKING SYM-TRIS(4-PYRIDYL) CYCLOHEXANES AND ALKYL SUBSTITUTED SYM-TRIS (4-PYRIDYL) CYCLOHEXANES
Heinz, Uelzmann, Cuyahoga Falls, Ohio, assignor to The General Tire & Rubber Company, a corporation of Ohio
No Drawing. Continuation-in-part of applications Ser. No. 507,556, Nov. 12, 1965, and Ser. No. 571,687, Aug. 11, 1966. This application Oct. 12, 1967, Ser. No. 674,760
Int. Cl. C07d 31/42
U.S. Cl. 260—296
10 Claims

ABSTRACT OF THE DISCLOSURE 4-vinyl pyridines are trimerized in the presence of an alkali metal organic imide in a solvent, for example the reaction product of sodium and ethylenimine in the presence of excess ethylenimine, to form 1,3,5-tris(4-pyridyl) cyclohexanes which can be reacted with alkyl benzene sulfonic acids to make oil soluble wetting agents useful in making water-in-oil emulsions. The 1,3,5-tris(4-pyridyl) cyclohexanes can also be hydrogenated to form 1,3,5-tris(4 - piperidyl) cyclohexanes. Both types of cyclohexanes find utility as accelerators for sulfur curable millable rubbers and resins, for example, natural rubber. The 1,3,5-tris(4-piperidyl) cyclohexanes can be used to cure epoxides, or anhydride containing polymeric materials (for instance, the copolymer of maleic anhydride and styrene); they will also crosslink or chain extend isocyanate terminated polyurethane prepolymers, or polyisocyanates, and can be used in the one-shot processes of making polyurethanes by mixing with the polyol, $H_2O$, etc. The 1,3,5-tris(4-piperidyl)cyclohexanes can be reacted with epoxides and/or episulfides to make ethers and/or thioethers and polyether and/or thioether polyols and/or polythiols which can be reacted with isocyanates or polyisocyanates to make polyurethanes and polythiourethanes.

This application is a continuation-in-part of prior patent applications S.N. 507,556, filed Nov. 12, 1965, and entitled "Method For Producing 1,3,5-Tris-4-Pyridylcyclohexane" and S.N. 571,687 filed Aug. 11, 1966 and entitled "Tris(4-Pyridyl) Cyclohexanes, Method For Making The Same, The Corresponding 4-Piperidyl Compounds and Their Use With Epoxides," both now abandoned.

This invention relates to a process for producing 1,3,5-tris(4-pyridyl) cyclohexanes and to the products of said process. More particularly, this invention relates to a process of trimerizing 4-vinylpyridine to produce 1,3,5-tris(4-pyridyl) cyclohexane. It, also, relates to the production of the corresponding 4-piperidyl type compounds and their use with epoxides and other reactants and so forth.

Heretofore, 1,3,5 - tris(4 - pyridyl) cyclohexane has been produced in very small yields by the pyrolysis of polymeric 4-vinylpyridine.

It is an object of this invention to produce 1,3,5-tris (4-pyridyl) cyclohexanes in yields higher than have heretofore been possible with a consequent reduction or elimination of by-products including polymers. Another object is to produce compounds of the 1,3,5-tris(4-pyridyl) cyclohexane type. A further object is to provide the corresponding 4-piperidyl type compounds. Still further objects are to provide novel curing, cross-linking, chain extending agents as well as accelerators. These and other objects and advantages of the present invention will become more apparent to those skilled in the art from the following detailed description and examples.

In accordance with this invention, 1,3,5-tris(4-pyridyl) cyclohexanes are produced by trimerizing 4-vinylpyridines employing a solvent for the 4-vinylpyridines in the presence of a catalytic amount of an alkali metal organic imide. The solvent, which can also be considered as a dispersant or function in part as a dispersant, is the secondary amine from which the alkali metal organic imide is prepared and which is preferred, or other secondary amine as defined herein, or mixtures of said amine(s), and of a solvent which is not proton-active, does not otherwise interfere or react with the alkali metal or alkali metal organic imide, or which does not deactivate the catalyst. Examples of solvents for use with said amines are low molecular weight ethers, polyethers, hydrocarbons, thioethers, i.e., dimethyl ether, dibutyl ether, ethers of ethylene glycol and diethylene glycol, diglyme, glyme, toluene, benzene, hexane, heptane, tetrahydrofuran, diisoamyl sulfide, dibutyl sulfide, quinoline, pyridine, etc.

Details of the process of making 1,3,5-tris(4-pyridyl) cyclohexanes

Secondary amines, preferably cyclic, which can be used in the practice of the present invention include piperidine; morpholine; pyrrolidine; ethylene imine; propylenimine; 2,3 - dimethyl ethylenimine; 2 - methyl piperazine; 2,6-dimethyl piperazine; 1,2 - butylenimine; 1,2 - amylenimine; azetidine; diethylamine; dibutylamine; ethyl propylamine; dihexyl amine; 2 - ethyl piperidine; 3 - ethyl piperidine; dioctyl amine; N-butyl aniline; 1,10-diazacyclooctadecane; N-phenyl benzylamine; hexamethylenimine; coniine; 2,6 - dimethyl morpholine; pyrrole; imidazole; pyrazole; pyrroline; indole; 2,5 - dimethyl piperazine; 1 - ethyl piperazine; imidazolidine; piperazine; indoline; and the like. Still other secondary amines can be used such as N-methyl aniline, N-ethyl butylamine, N-ethyl cyclohexylamine, difurfuryl amine, N($\beta$-ethoxy ethyl)methylamine, 1 - methyl piperazine, 1 - phenyl piperazine, 2 - pipecoline, tetrahydro - 1,4 - thiazine and the like.

Very desirable to use are cyclic secondary amines of the general formula $[(CR_2)_{m-n}(X)_n]NH$ where R is selected from the group consisting of hydrogen and alkyl radicals of from 1 to 4 carbon atoms and mixtures thereof, where X is oxygen or sulfur, where $m$ is a number from 2 to 7, where $n$ is 0 or 1, and when X is 1 there are always at least 3 $CR_2$ groups present, two of the $CR_2$ groups being attached through the C atom directly to the nitrogen atom.

These secondary amines have from 2 to 20 carbon atoms and from 1 to 2 secondary amino nitrogen atoms. While mixtures of the secondary amines can be used, it is preferred to use a single secondary amine to facilitate handling and recovery of the amine and solvent.

The reaction is conducted by forming an admixture of the secondary amine or secondary amine-solvent mixture containing a small amount of alkali metal organic imide catalyst most of which is in dispersed form in the solvent. This admixture is stirred and heated and the 4-vinyl-pyridine compound added. It is preferred that the addition be one incrementally since the reaction is usually extremely exothermic and the temperature rises quickly to cause the secondary amine to boil. By the incremental addition, the temperature of the reaction is maintained at approximately 20 to 70° C., preferably 54° C., when using 4-vinyl-pyridine, ethyleneimine, and sodium or sodium ethylene imide. As would be obvious to one skilled in the art, too fast an addition would cause too violent boiling of the solvent which might lead to an uncontrollable reaction. All starting materials, solvent, etc., should be of very high purity to get high yields.

In place of 4-vinyl pyridine, other low molecular weight 4-vinyl pyridines can be used in the method of the present invention, such as 2-methyl-4-vinyl pyridine, 2-ethyl-4-vinyl pyridine, 2-butyl-4-vinyl pyridine, 2,6-dipropyl-4-vinyl pyridine, 2-isopropyl-6-butyl-4-vinyl pyridine, 2-methyl-6-isobutyl-4-vinyl pyridine and the like and mixtures thereof. These compounds have the general formula

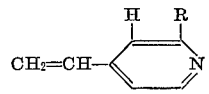

where R is selected from the group consisting of hydrogen and an alkyl radical of from 1 to 4 carbon atoms of the present invention it is preferred to employ single 4-vinyl pyridine compounds rather than mixtures.

The amount of solvent is not narrowly critical and can be from 100 parts by volume of the solvent for each 100 parts by volume of the 4-vinyl pyridine compound to 1,000 parts by volume of the solvent to 1 part by volume of the 4-vinylpyridine, or even higher. Substantial amounts of solvent favor trimerization over polymerization.

The amount of alkali metal organic imide employed as a catalyst is not narrowly critical but a sufficient amount should be present to cause trimerization rather than polymerization. It can range from .05% by weight based on the weight of the 4-vinylpyridine compound used to 10% by weight based on the weight of the 4-vinylpyridine compound. Larger amounts can be employed; however, no commensurate advantages are obtained thereby.

The alkali metal organic imide catalyst can be prepared in situ in the solvent by the reaction of the secondary amine with at least one material selected from the group consisting of M and MA where M is an alkali metal and A is selected from the group consisting of —NH$_2$, —H, and —R where R is a saturated hydrocarbon radical of from 1 to 18 carbon atoms. Examples of M and MA are lithium, sodium, potassium, rubidium, cesium, ethyl lithium, n-butyl sodium, n-butyl lithium, methyl potassium, phenyl sodium, ethyl potassium, sodamide, lithium amide, potassamide, cesium amide, sodium hydride, lithium hydride, cesium hydride, potassium hydride, rubidium hydride, and the like and mixtures of the same. On the other hand, the catalyst can be prepared outside the environment of the solvent and added to the solvent. Of these catalysts, sodium and potassium and their above compounds are referred.

The temperature at which the trimerization takes place is not narrowly critical. It can vary from about 20° C. to as high as 300° C., preferably from about 20 to 200° C. However, it is preferred to maintain the temperature at a point at which the solvent is refluxing (boiling point of the solvent at a controllable rate. In some instances using certain catalysts and/or secondary amines it is necessary to increase the temperature to initiate reaction and/or to obtain satisfactory yields of trimer and/or to reduce the amount of polymer formation. The trimerization of the 4-vinyl pyridine compound can be conducted at atmospheric pressure, super-atmospheric pressure and sub-atmospheric pressure.

Since the reactions involve the use of alkali metals, organo alkali metallic compounds, etc., the reactions should be conducted under an inert or non-reactive atmosphere or in one free of moisture. Examples of useful atmospheres to use are nitrogen, helium, neon, argon, dry air, and the like and mixtures thereof.

The trimerized -vinyl pyridines produced by the method of the present invention have the general formula:

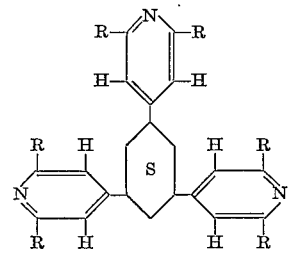

where R is selected from the group consisting of hydrogen and alkyl radicals of from 1 to carbon atoms, i.e., methyl, ethyl, propyl, butyl, isobutyl, etc. and mixtures thereof. Examples of such compounds are 1,3,5-tris-(4-pyridyl)cyclohexane;
1,3,5-tris-(2-methyl-4-pyridyl(cyclohexane;
1,3,5-tris(2,6-dimethyl-4-pyridyl) cyclohexane;
1,3,5-tris(2,6-diethyl-4-pyridyl)cyclohexane;
1,3,5-tris(2-isopropyl-4-pyridyl)cyclohexane;
1,3,5-tris(2-isobutyl-6-propyl-4-pyridyl)cyclohexane;
1,3,5-tris(2,6-dibutyl-4-pyridyl)cyclohexane;
1-(4-pyridyl,3-(2,6-dimethyl-4-pyridyl),5-(2-methyl-4-pyridyl)cyclohexane; and the like and mixtures thereof.

The 1,3,5-tris(4-pyridyl)cyclohexanes find utility in the preparation of wetting agents by reaction with alkyl benzene sulfonic acids to form salts with the same. Thus, for example, for each mole of the 1,3,5-tris(4-pyridyl)cyclohexane compound, one can employ 1, 2 or 3 moles of dodecyl benzene sulfonic acid to yield a wetting agent which is oil soluble to make water-in-oil emulsions. These cyclohexane compounds also can be treated by methods known in pyridine chemistry leading to the introduction of new substituents on the pyridyl rings such as —NH$_2$, —NO$_2$, —SO$_3$H, acyl, halogen and the like.

The following examples will serve to further illustrate this invention with more particularity to those skilled in the art. In the examples, all parts are by weight unless otherwise set forth.

EXAMPLE 1

Into a 1-liter, 3-neck flask, fitted with a dropping funnel, reflux condenser, thermometer and stirrer, pure ethylene imine (250 grams) and sodium (6 grams) were charged under a nitrogen atmosphere. The mixture was heated to approximately 45° C. for about 20 minutes with stirring. Freshly distilled 4-vinyl pyridine (210 grams) was added drop-wise into the vortex of the rapidly stirred mixture. A dark red color appeared and the temperature rose to approximately 50° C. rapidly. The rate of addition of 4-vinyl pyridine was controlled so that the reaction temperature was maintained between 50° C. and 54° C. After the addition of the 4-vinyl pyridine was completed, the reaction mixture was refluxed (approximately 54° C.) for 1 additional hour. Then most of the ethylene imine was distilled off into a Dean-Stark trap and the reaction mixture cooled. After cooling, 100 cubic centimeters of isopropanol were added to the flask with stirring to form sodium isopropoxide and release ethylene imine by reaction with the sodium ethylene imide, i.e.,

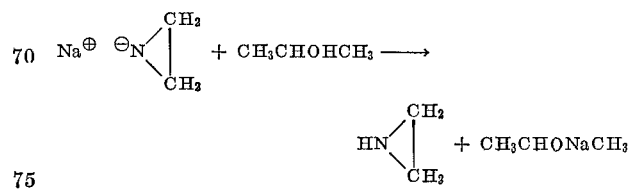

EXAMPLE 7

To a nitrogen flushed 1 liter 3 neck flask were charged 510 g. of piperidine (redistilled) and 6 g. of potassium. The flask and contents were heated (about 105–110° C.) to refluxing for 30 minutes. Then 105 g. of 4-vinyl pyridine were slowly added while continuing heating and refluxing. After addition the contents were stirred for 45 minutes at refluxing temperature. The trimerization took place suddenly after 45 minutes of stirring and part of the material boiled out of the flask because of the heat produced. Therefore, part of the product was lost. The remaining material was poured into 700 cc. of demineralized water in a beaker, stirred for 10–15 minutes and then filtered. The precipitate or filter cake (1,3,5-tris(4-pyridyl) cyclohexane) weighed 90 g. (85.7% of theory). The precipitate was recrystallized from dimethyl formamide and had a melting point of 225–227° C.

EXAMPLE 8

To a nitrogen flushed 1 liter flask were charged 228 g. (2.62 m.) of pure morpholine and 3 g. of potassium. The contents of the flask were refluxed for 1 hour at 126° C. Then there were added to the contents of the flask 46.2 g. (0.44 m.) of 4-vinyl pyridine dropwise so as to maintain refluxing over 30 minutes. A purple complex was formed immediately and the reaction was fairly exothermic. After the addition of the 4-vinyl pyridine heat was maintained and the contents of the flask were refluxed for 30 additional minutes. The morpholine was distilled from the flask using a Dean-Stark trap; 190 cc. of morpholine were recovered. Then 25 cc. of (2% $C_6H_6$) ethanol were added to the flask to destroy any unreacted potassium. The contents of the flask were then poured into 500 cc. of $H_2O$, and the precipitate obtained was filtered, washed with water and dried. The yield obtained of 1,3,5-tris(4-pyridyl) cyclohexane was 43 g. (93.1% of theory); it had a melting point of 224–227° C.

EXAMPLE 9

To a nitrogen flushed 500 cc. flask were charged 3 g. of potassium and 270 g. (2.09 mols) of dibutyl amine (freshly distilled over sodium). The contents of the flask were heated and refluxed (about 158° C.) for 1 hour. Then 42 g. (.39 mole) of 4-vinyl pyridine were slowly added to the flask while refluxing and over a period of 30 minutes. The flask and contents were heated and refluxed while stirring after addition of the 4-vinyl pyridine.

During the addition of the 4-vinyl pyridine a sticky red complex formed on the potassium. This caused the formation of a lump of material. As the addition proceeded the lump dissolved and near the end of the addition again reformed. The dibutylamine was distilled off from the flask using a Dean-Stark trap; then 50 cc. of denurated ethanol was added to the flask to destroy any excess potassium. This mixture in the flask was allowed to stand for about 60 hours and then was poured into 300 cc. of demineralized water in a beaker, stirred, filtered and dried. The yield of product (1,3,5 - tris(4 - pyridyl)cyclohexane) was 14 g. (33.3% of theory). A small portion of the above dry product was re-crystallized from dimethyl formamide, washed once with benzene, and dried; it melted at 221–225° C.

Hydrogenation of tris(4-pyridyl) cyclohexanes

It has also been found that the 1,3,5-tris(4-pyridyl) cyclohexanes can be hydrogenated employing Raney nickel, platinum, nickel and kieselguhr, palladium black, palladium deposited on carbon black, copper chromite, etc., as a hydrogenation catalyst with hydrogen under pressure, for example, about 1000–10,000 p.s.i.g., and at a sufficient temperature, for example, of from about 50 to 350° C. in a solvent to produce 1,3,5-tris(4-piperidyl) cyclohexanes which are useful as chemical intermediates. These 4-piperidyl cyclohexanes have the general formula

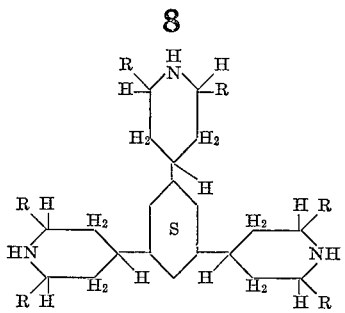

where R is selected from the group consisting of hydrogen and alkyl radicals of from 1 to 4 carbon atoms such as methyl, ethyl, propyl, isopropyl, butyl, etc. and mixtures thereof. Examples of such compounds are 1,3,5-tris(4-piperidyl)cyclohexane;
1,3,5-tris(2-methyl-4-piperidyl)cyclohexane;
1,3,5-tris(2,6-dimethyl-4-piperidyl)cyclohexane;
1,3,5-tris(2,6-diethyl-4-piperidyl)cyclohexane;
1,3,5-tris(2-isopropyl-4-piperidyl)cyclohexane;
1,3,5-tris(2-isobutyl-6-propyl-4-piperidyl)cyclohexane;
1,3,5tris(2,6-dibutyl-4-piperidyl)cyclohexane;
3,2,6-dimethyl-4-piperidyl),
5-(2-methyl-4-piperidyl)cyclohexane; and the like.

EXAMPLE 10

A one-gallon autoclave equipped with a stirrer was purged with hydrogen gas at room temperautre and atmospheric pressure. Then there were added to the reactor and mixed together 151 grams of 1,3,5-tris(4-pyridyl)cyclohexane, 3 liters of methyl cyclohexane, and 15 grams of Raney nickel. The reactor was then pressurized (2000–4000 p.s.i.g.) with hydrogen. The hydrogenation was conducted for ½–1 hour at a temperature of about 200° C. until hydrogen uptake was complete. At the end of the reaction, the reactor was cooled and the mixture was poured into a container. After standing for awhile the solvent containing the hydrogenated trimer (1,3,5-tris(4-piperidyl)cyclohexane) was decanted and filtered through a fabric filter to remove the catalyst and then subjected to continuous distillation to remove the methyl cyclohexane. When the hydrogenated trimer was subjected to vacuum distillation (200° C. and 0.2 mm. of Hg.), no distillate came over. The hydrogenated trimer at room temperature was almost transparent and felt tacky; it became a liquid when heated to 80° C. It was soluble in isopropanol, methanol, benzene, and ketones.

Analysis gave the following results: percent nitrogen: Found 11; calculated 12.6. Percent NH: Found 13.50, 13.31; calculated 13.53; meq./g. 8.99, 8.87; Molecular weight: Found 350; calculated 333.4 (vapor phase osometry).

Use of tris(4-piperidyl)cyclohexanes as curing agents

The 1,3,5-tris(4-piperidyl)cyclohexanes are useful as curing agents for epoxide resins. For example, from about ½ to 45 parts by weight of the tris-4-piperidyl cyclohexanes based on 100 parts by weight of the epoxide resin can be used to cure the resin in forming potting compounds; in binders for laminates for paper; polyester fabrics, glass fiber cloths or products or mixtures thereof; wood sheets; in coatings on metal such as steel; in adhesive compositions; and so forth. The tris-4-piperidyl cyclohexane in finely divided form can readily be dispered throughout the epoxide resin or can first be melted or dissolved in solvent and then blended with the epoxide resin. Curing times and temperatures can be those customarily employed in the art. Epoxy or epoxide resins and methods for handling them are disclosed in the book "Epoxy Resins" by Lee and Neville, McGraw-Hill Book Co., Inc., New York, 1957, 297 pages. Mixtures of epoxide resins and mixtures of the tris-4-piperidyl cyclohexane compounds can be used. Of course, if desired, other known The resulting mixture was then transferred into a beaker, and the flask washed with isopropanol (400 ml.) which was also added to the contents of the beaker. The beaker was then heated on a hot plate in a hood with good ventilation to distill off the remaining ethylene imine. Features of this process are that part of the solvent is used to form the catalyst and that the solvent can be completely or almost completely recovered for further use.

The mixture was then cooled yielding a crystalline precipitate. This crystalline precipitate was filtered, washed with water, and dried at 40° C. and at about 20 mm. of mercury. This crystalline precipitate weighed 184 grams which is 89% of theory based on the starting 4-vinyl pyridine. The crystalline material was recrystallized from methyl ethyl ketone to yield 1,3,5-tris(4-pyridyl)cyclohexane having a melting point of 227–229° C. It was also recrystallized from dimethyl formamide as well as from dimethyl acetamide.

Analysis of the 1,3,5-tris(4-pyridyl)cyclohexane gave the following results.

Molecular weight: Found 310. Calculated 315.
Nitrogen: Found 13.06%. Calculated 13.3%.
Carbon: Found 79.24%. Calculated 80.0%.
Hydrogen: Found 6.70%. Calculated 6.72%.

Infrared analysis showed the trimer obtained was identical with the product isolated from the pyrolized poly-4-vinyl pyridine as described in "Tetrahedron Letters," No. 17, pages 998–1004 (1964).

When the above example was repeated but the solvent was a mixture of 90 parts by volume of ethylene imine and 10 parts by volume of glyme (ethylene glycol dimethylether) similar results were obtained. The use of 4-isopropenyl pyridine, 3-vinyl pyridine or 2-vinyl pyridine in place of 4-vinyl pyridine did not provide a trimer using the present process.

EXAMPLE 2

The method of this example was similar to that of Example 1, above. To a 250 cc. nitrogen flushed flask were charged 125 g. of ethylenimine and 3 g. of potassium. The flask and contents were heated to 45° C., and then there was slowly added 105 g. of 4-vinyl pyridine. The mixture was then distilled using a Dean-Stark trap to remove the excess ethylenimine. The distilled mixture next was cooled and poured into a large volume of water and methanol (5:1 volume ratio) where the crystals of trimer separated from the oily polymer obtained. Filtration of the water-methanol mixture using a fritted glass filter followed. The crystals or precipitate of the trimer were washed and dried. A yield of 22 grams (21% theory) of 1,3,5-tris(4-pyridyl)cyclohexane was obtained.

EXAMPLE 3

The method of this example was similar to that of Examples 1 and 2, supra. Into a 250 ml. nitrogen flushed flask were charged 125 g. of ethylenimine and 3 g. of potassium (freshly cut). The flask and contents were heated to 45° C. and the dropwise addition of 53 g. (0.5 m.) of 4-vinyl pyridine was begun as soon as a blue complex was formed on the K, keeping the temperature between 51 and 54° C. After the addition the mixture was refluxed for 1 hour. The mixture was then cooled, and the ethylenimine was distilled out. The reaction product was precipitated with 3 liters of cold water and filtered. The trimerization product was soluble in methanol. The precipitate obtained was dried and it weighed 36 g. (67.9% of theory). After recrystallization from dimethyl formamide the precipitate (1,3,5-tris-(4-pyridyl)cyclohexane) had a M.P. of 226–228° C.

This example shows that by increasing the temperature only 6–9° C. and by using a more dilute reaction mixture, the yield of trimer obtained is over 3 times that of Example 2, above.

EXAMPLE 4

Into a nitrogen flushed 1 liter 3 neck flask were charged 342 g. (6 m.) of propylenimine, freshly distilled without inhibtor, and 6 g. of sodium, freshly cut. The flask and contents were refluxed for 2 hours at about 65° C. 4-vinyl pyridine was added slowly at 58° C. without any reaction; approximately 20 cc. additional of 4-vinyl pyridine were added without any reaction. The addition was stopped as the flask had cooled and heat was applied to the mixture until it began refluxing again. As the mixture refluxed, a slight pink color formed, then suddenly the reaction mixture began forming a very dark red color and the addition was resumed at a rate that kept the pyropylenimine refluxing. The addition time was 20 minutes, and the total amount of 4-vinyl pyridine added was 105 g. The mixture in the flask was refluxed an additional 50 minutes at 66° C. A Dean-Stark trap was connected and the excess (250 cc.) propylenimine was distilled off. 50 cc. of ethanol (denatured, contained 2% benzene) were added to the flask to destroy any sodium metal remaining and this resulting mixture was added to 500 cc. of demineralized water in a beaker. The flask was rinsed with 200 cc. more of demineralized water. The contents of the beaker were stirred and allowed to stand for ½ hour and filtered. The product, 1,3,5-tris(4-pyridyl)cyclohexane, obtained amounted to 61 g. (58.1% yield of theory). The product was re-crystallized from dimethyl formamide, washed with pure benzene and dried. Its melting point was 222–226° C. If the secondary amine and sodium have not reacted sufficiently to form an alkali metal organic imide catalyst in sufficient amounts, polymerization will dominate rather than trimerization, or the entire product will be a polymer. It is known that vinyl pyridines are somewhat unstable and undergo self-polymerization.

EXAMPLE 5

The method of this example was similar to the methods of Examples 1 to 4, above. Into a nitrogen flushed 1 liter flask were charged 342 g. (6 m.) of propylenimine (freshly distilled from barium oxide) and 6 g. of potassium (freshly cut). The flask and contents were refluxed for 40 minutes. There were next added 105 g. 4-vinyl pyridine at 64° C. with immediate reaction and a color (dark red) change occurring. The addition rate was adjusted to keep the propylenimine just refluxing, and the addition time was 20 minutes. A Dean-Stark trap was connected and the excess (281 cc. propylenimine) was stripped out. Next, 50 cc. of denatured ethanol were added and the contents were stirred for 30 minutes. The resulting mixture was poured into 500 cc. of cold demineralized water in a beaker. After ½ hour the material in the beaker was filtered and the precipitate obtained was dried. The yield was 34 g. (32.4% of theory). The product, 1,3,5-tris(4-pyridyl)cyclohexane, had a melting point of 224–227° C.

EXAMPLE 6

To a nitrogen flushed 1 liter flask were charged 213 g. of pyrrolidine and 3 g. of potassium. The flask and contents were heated and refluxed (about 88–95° C.) for 30 minutes. Then over a period of 30 minutes 52.5 g. of 4-vinyl pyridine were added while refluxing. The flask and contents were heated for another 30 minutes under refluxing conditions when 25 cc. of (2% $C_6H_6$) ethanol were added and the excess pyrrolidine was distilled off using a Dean-Stark trap. The contents remaining in the flask were poured into a beaker containing 400 cc. of demineralized water. Following this, the contents of the beaker were filtered and the precipitate obtained was dried to yield 44 g. (83.8% of theory) 1,3,5-tris(4-pyridyl)cyclohexane. The product was re-crystallized in dimethyl formamide, filtered, washed twice with pure benzene and dried to give a melting point of 226–228° C.

curing agents, reinforcing or color pigments, compounding ingredients and the like can be added to the epoxide resin composition.

EXAMPLE 11

16 grams of Epon 828 and 4 g. of 1,3,5-tris(4-piperidyl) cyclohexane were mixed together in a beaker at 80° C. and allowed to cool. After 10 minutes cooling, the mixture was thick; after 20 minutes, it had become a thick paste. After 30 minutes the mixture had become a tough paste; and after 1 hour, it had cured to a non-tacky solid which could be dented.

16 grams of Epon 828 and 4 g. of 1,3,5-tris(4-piperidyl) cyclohexane were mixed together in a beaker at 80° C. After cooling for ten minutes, a thick paste had formed, and the mixture was then placed in an oven at 80° C. for 10 minutes. On removal from the oven and cooling to room temperature, a hard solid block was obtained which could not be dented.

18 grams of Epon 828 and 2 g. of 1,3,5-tris(4-piperidyl) cyclohexane were mixed in a beaker at 80° C. and then allowed to cool. After 13 hours a non-tacky solid was obtained which could be dented.

All of the above cured epoxide resins were dark blue-green. Epon 828 is a bisphenol A-epichlorohydrin type epoxy resin which is a liquid at room temperature, has a Gardner color at 25° C. of 12 (max.) and has an epoxide equivalent of 175–210, an average molecular weight of 350–400 and a viscosity at 25° C. of 5000–15,000 centipoises.

The 1,3,5-tris(4-piperidyl)cyclohexanes may also be reacted with acyl halides RCOX, i.e., RCOCl, where R is methyl, ethyl, or other active hydrogen free organic group, to produce amides, or also polyamides and with isocyanates or multiisocyanates to make ureas and polyureas and to crosslink and/or chain extend isocyanate containing polyurethanes such as isocyanate containing -polyesterurethanes, -polyetherurethanes, -polyetheresterurethane, -polyamides, etc. Sufficient amounts of the piperidyl cyclohexanes are used to obtain the desired degree of chain extension and/or crosslinking.

Instead of reacting the sym-tris-piperidyl cyclohexane with an isocyanate terminated prepolymer or with a polyisocyanate, it can be mixed with the ingredients forming the polyurethane such as the polyol (polyether, polyester and/or polyether-ester or grafted polyols, i.e., where vinyl chloride or acrylonitrile, etc. has been graft polymerized on the polyol backbone), catalyst if any or blowing agent and reacted together essentially at the same time with the polyisocyanate to form the polyurethane. A sufficient, usually a minor amount by weight of the cyclohexane as compared to the total weight of the polymer, is used to at least in part crosslink and/or chain extend the urethane polymeric units as they are formed. The resulting polyurethanes can be rigid or flexible, porous or non-porous depending on the selection of polyols, polyisocyanates, blowing agent, etc. and the amount of the cyclohexane compound used.

EXAMPLE 12

255 grams (.6 mole) of PPG–425 (a polypropylene ether glycol having a molecular weight of about 425) was reacted with 208.8 g. (1.2 moles) of tolylene diisocyanate (a mixture of 80% 2,4- and 20% 2,6-isomers) and slowly heated to 150° C. Then it was allowed to cool and was stored under a nitrogen atmosphere. The polyetherurethane prepolymer was isocyanate terminated, was very viscous (barely flowed) at room temperature (about 25° C.) and was a liquid at 80° C.

The 1,3,5-tris(4-piperidyl)cyclohexane was liquefied at 80° C. and 1 gram of this liquid was weighed into 5 cc. of hot dimethyl formamide until the cyclohexane compound had dissolved. This solution of the sym-tris(4-piperidyl)cyclohexane in DMF was then added to 20 grams of the above isocyanate terminated polyetherurethane prepolymer. Instant crosslinking and gel formation occurred. This example shows that the hydrogenated trimer is a crosslinking or chain extending agent in the production of polyurethanes.

EXAMPLE 13

3.33 g. of the sym-tris(4-piperidyl)cyclohexane were dissolved in 30 cc. of DMF and 3.6 g. of phenyl isocyanate were added. The reaction was exothermic and a clear solution was obtained. After standing for one hour the solution was poured into water, the resulting precipitate was filtered, washed with water and dried at 80° C. under a vacuum. The melting point of the vacuum dried product was 105–107° C.

Analysis for nitrogen (N) showed: percent N: Found, 10.58; calculated, 12.19.

This product has the general formula where Ph is phenyl:

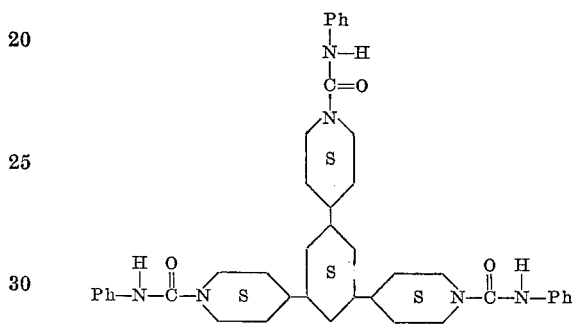

The 1,3,5 - tris(4 - piperidyl)cyclohexanes can be used as curing agents for unsaturated anhydride copolymers such as copolymers of maleic anhydride and the like and one or more other monomers such as styrene, substituted styrenes, vinyl acetate, mixtures of vinyl acetate and vinyl chloride, ethylene, propylene, and vinyl ethers such as methyl vinyl ether and other low molecular weight vinyl ethers as well as the vinyl ethers of long chain alcohols and mixtures thereof. Methods of making copolymers and the like from maleic anhydride are disclosed in the book "Vinyl And Related Polymers," Schildknecht, John Wiley and Sons, Inc., New ork, 1952. Sufficient minor amounts of the tris(4-piperidyl)cyclohexanes can be mixed with these unsaturated anhydrides under water free or essentially water free conditions to cure through opening of the anhydride group to form flexible plastic compositions useful for fabric coatings, moldings and so forth while somewhat larger, although still minor, amounts can be used to form rigid and semi-rigid products such as tote boxes, refrigerator walls and cabinets. Sufficient times and temperatures are used to get the desired curing. The copolymers prior to curing can be compounded with the various fillers known to the art such as carbon black, $SiO_2$, $TiO_2$, glass fibers, stabilizers, color pigments and so forth.

Use of the tris(4-piperdyl)cyclohexanes as telogens in the preparation of polyether and polythioether polyols Moreover, the 1,3,5 - tris(4 - piperidyl)cyclohexanes are of use in the preparation of ethers and polyether polyols as well as thioethers, polythioether polythiols, polyether polythiols and polythioether polyols. Low molecular weight polyether polyols are made by reacting 1 mole of the piperidyl cyclohexane with from about 3 to 9 moles of an epoxide monomer. The resulting polyol or triol can then be used to make rigid or semi-rigid polyether urethanes by further reaction wtih polyisocyanates such as tolylene diisocyanate, "Papi," hexamethylene diisocyanate, naphthalene diisocyanates, triisocyanates and other polyisocyanates. Addition of $H_2O$ or fluorocarbons, or other blowing agent, and chain extenders if desired, silicones, dispersing agents, pigments, etc., can be used in the polyurethane forming reaction to make foams. If higher mol ratios of the epoxide are used such as 15, 30, 100 mols or more per mol of the tris-4-piperidyl cyclohexane compound, branched long chain polyether polyols will be obtained which can subsequently be reacted with polyisocyanates, etc., to make flexible or rubbery materials or mixed with foaming ingredients as discussed above to make flexible and/or rubbery polyetherurethane foams.

The epoxides or organic cyclic oxides which can be reacted with the tris-4-piperidyl cyclohexane compounds can be any epoxide having a ring of 2 carbon atoms and 1 oxygen atom and containing up to a total of 25 carbon atoms, preferably not over 12 carbon atoms. The alkenyl, nitro, ether, ester and halogen (except easily ionizable halogen substituted derivatives) substituted derivatives of these cyclic oxides can likewise be employed. Mixtures of these epoxides can be used. Examples of useful cyclic oxides are ethylene oxide (1,2 epoxy ethane), propylene oxide, 1,2-butene oxide, 2,3-butene oxide, 1,2-dodecane oxide, isobutylene oxide, styrene oxide, epichlorohydrin, 1,2-pentene oxide, isopentene oxide, 1,2-diisobutylene oxide, 1,2-hexene oxide, 2,3-hexene oxide, 1,2-heptene oxide, allyl glycidyl ether, crotyl glycidyl ether, isoheptene oxide, octene oxide, nonene oxide, decene oxide, hendecene oxide, methyl glycidyl ether, ethyl glycidyl ether, vinyl cyclohexene monoxide, phenyl glycidyl ether, 3-methyl-3,4-epoxy butene-1, butadiene monoxide, glycidyl methacrylate, 2,3-diisobutylene oxide, dicyclopentadiene monoxide, isoprene monoxide, tolyl glycidyl ether, pentadecene oxide, 1,2-epoxy pentacosane, allyl epoxy stearate, and other cyclic oxides.

The epoxides can be reacted with the tris-4-piperidyl cyclohexane compounds in mass or in a solvent (such as an ether or a hydrocarbon) under conditions which are free of or essentially free of water, or other material which would adversely affect the polymerization, for a period of time and at a temperature sufficient to get the desired polymerization or conversion. Temperatures of from about 40 to 250° C. can be used using an alkali metal hydroxide (LiOH, NaOH, KOH, CsOH, RbOH), preferably KOH, as a catalyst to produce the tris-4-piperidyl cyclohexane polyether polyols. Other catalysts may be used which do not reduce the desired hydroxyl functionality. If less than a mole such as ⅓ mole of the epoxide is used, it will be clear that on the average the resulting material will have only one OH group and two secondary amino groups. Using ⅔ mole of epoxide to one mole of the cyclohexane will provide a diol. If the tris-4-piperidyl cyclohexane compound and the epoxide are in a ratio of 1:3 moles, the average OH functionality according to the kinetics of the alkaline reaction will approach and be close to 3 or be essentially 3. Using greater than 3 moles of epoxide such as 10 to 100 or more per mol of the tris-4-piperidyl cyclohexane will provide long chain polyether groups terminating on the average in OH groups and having an OH functionality approaching or being 3. The length of the chains on any one piperidyl nucleus, however, may vary depending on the reaction conditions.

The corresponding sulfur analogs in which a sulfur atom replaces the oxygen atom in the cyclic ether can be used in a similar manner. Examples of such cyclic sulfides are: 4,5-epithio-1-pentene; 5,6-epithio-1-hexene; 5,6-epithio-2-hexene; ethylene sulfide; 1,2-propylenesulfide; 9,10-epithio-1-decene; 7,8-epithio-2-methyl-1-octene; 1,2-epithio-1-(2-cyclopenten-1-yl) ethane; 3-allyloxy-1,2-epithio propane; 3-(2-butenyloxy)-1,2-epithio propane; 1,2-epithio-1-(3-cyclohexen-1-yl)ethane; 3-allylthio-1,2-epithio propane; 3-(2-butenyl-thio)-1,2-epithio propane; 3-(1-methyl allyloxy)-1,2-epithio propane; 3 - (1-methyl - 2 - butenyloxy) - 1,2 - epithio propane; 3-(2-cyclohexen-1-yloxy)-1,2-epithio propane; 3-(3-methyl-4-hexenyloxy)-1,2-epithio propane; 2,3-epithio butane; cyclohexene sulfide; isobutylene sulfide; styrene sulfide; vinyl thiirane; 1,2-octene episulfide; crotyl oxy-1,2-epithio propane; 2,3-dimethyl-2-butene sulfide; 3,3-dimethyl thiocyclobutane; thiocyclobutane; allyl thio-1,2- epoxy propane; and other episulfides and mixtures thereof.

Mixtures of the episulfides and epoxides can be used. Moreover, for example, the 1,3,5-tris(4-piperidyl)cyclohexane can be reacted with several mols of an epoxide and then with several mols of an episulfide, or after reacting with several mols of an epoxide, it can be end-capped at the end of each chain with an episulfide. Likewise, the cyclohexane can first be reacted with the episulfide and then with the epoxide. Thus, there can be obtained polymers with all ether or sulfide linkages, mixed ether and sulfide linkages, blocks of ether and sulfide linkages, and end groups which have —OH and/or —SH radicals and which radicals can be primary, secondary and/or tertiary radicals. These polyols can subsequently be grafted with vinyl chloride, acrylonitrile, methyl methacrylate using a free radical catalyst.

The resulting 1,3,5-tris (4-piperidyl)cyclohexane polyether or thioether polymers have the following general formula:

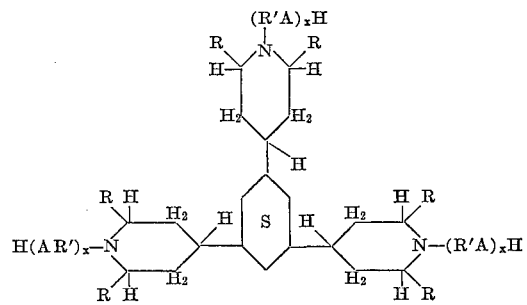

where R is selected from the group consisting of hydrogen and an alkyl radical of from 1 to 4 carbon atoms and mixtures thereof, where R' is the

group of the opened epoxide and/or episulfide ring of 2 carbon atoms and one oxygen and/or sulfur atom of a polymerizable epoxide and/or episulfide having a total of from 2 to 25 carbon atoms, where x is zero or a number, where there is at least one —(R'A)H group present, and where A is selected from the group consisting of oxygen and sulfur and mixtures thereof. Preferably x is a number of from 5 to 35 to make materials useful in making flexible polyurethane foams and is a number of from 1 to 3 in making rigid polyurethane foams. Moreover, (R'A) is preferably

and/or

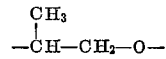

Use of the tris(4-pyridyl) and (4-piperidyl)cyclohexanes as accelerators

The 1,3,5-tris(4-pyridyl)cyclohexanes as well as the 1,3,5-tris(4-piperidyl)cyclohexanes, further, are useful as primary or secondary accelerators in the curing of the ethylenically unsaturated polymeric materials, polymers and copolymers, by means of a sulfur type curing agent such as sulfur, selenium, tellurium, bis morpholine tetra sulfide, bis benzothiazyl disulfide or tetrasulfide, dipentamethylenethiuram tetrasulfide, selenium diethyldithio-carbamate, selenium dimethyl dithiocarbamate, tetramethyl thiuram disulfide, tetraethyl thiuram disulfide and the like and mixtures thereof.

The polymers and copolymers used can be natural rubber, balata or guttapercha etc. or those made by ionic (Ziegler type) or free radical (peroxide, persulfate, etc.)

catalysts in bulk, solvent, suspension or emulsion systems. Examples of synthetic polymers and copolymers which can be used are those obtained by the polymerization of conjugated dienes such as butadiene-1,3, isoprene, dimethyl butadiene, chloroprene, and other conjugated dienes of from 4 to 8 carbon atoms, alone or in admixture; or co-, ter- or other polymers of one or more of the above conjugated dienes and one or more monethyleneically unsaturated monomers such as styrene, substituted styrenes, acrylonitrile, methacrylonitrile, ethacrylonitrile, methyl acrylate, methyl methacrylate, ethyl acrylate, ethyl methacrylate, butyl acrylate, octyl acrylate, vinyl pyridine, and the like and mixtures thereof. Graft polymers can also be used. Specific examples are GRS, nitrile rubbers, acrylate rubbers, neoprenes, etc. The monoethylenically unsaturated monomers are used in an amount of from 15 to 85% by weight as compared to the conjugated dienes depending on whether a millable rubbery or a millable thermoplastic curable resinous material is desired, on whether polymers or copolymers are to be blended together, and on the final products desired, rubber tires, coating, paints, cellular products, tubes, shoe soles, hose, insulated wires, gaskets, automobile body mounts, torsion bars, and so forth. Such polymers and blends thereof are well known to those skilled in the art.

Still other polymers and copolymers can be used such as butyl rubber, a copolymer of isobutylene and a small amount of isoprene; copolymers of ethylene oxide, propylene oxide, butylene oxide, phenyl glycidyl ether and other aliphatically saturated epoxide monomers with a minor amount by weight of one or more ethylenically unsaturated epoxides such as butadiene monoxide, vinyl cyclohexene oxide, allyl glycidyl ether, crotyl glycidyl ether and the like. The corresponding episulfide copolymers can also be used as well as those copolymers obtained by copolymerizing epoxides and episulfide monomers, i.e., propylene oxide and allyl thioglycidyl ether. Still other ethylenically unsaturated polymers can be used such as the condensation polymers, i.e., ethylenically unsaturated polyesterurethanes, polyetherurethanes, polyetheresterurethanes and the like where the ethylenic unsaturation may be in the backbone chain or in a side chain. Yet other polymers can be used such as the ethylenepropylene polymers containing small amounts of copolymerized dienes conjugated or non-conjugated, although preferably non-conjugated dienes are used such as hexadiene-1,4,norbornene, ethylidene norbornene, dicyclopentadiene, cyclooctadiene. Mixtures of the foregoing polymers and copolymers can be used.

Various compounding ingredients can be used with these millable sulfur vulcanizable ethylenically unsaturated polymeric materials as is well known in the rubber and plastic art such as furnace or channel carbon blacks or other blacks, silica, $TiO_2$, calcium silicates, clay, whiting, color pigments, zinc oxide, stearic acid, zinc stearate, lubricants, waxes, oils such as extending oils, plasticizers, blowing agents, reodorants, anti-oxidants, anti-degradants, stabilizers, fungicides, other accelerators, and other rubbers and resins, natural and synthetic such as styreneacrylonitrile copolymers, acrylonitrile-styrene-butadiene terpolymers, and so forth.

The 1,3,5-tris(4-pyridyl) and (4-piperidyl)cyclohexanes are used in an amount sufficient to accelerate the cure of the polymer and preferably in an amount of from about 0.2 to 3.7 parts by weight based on 100 parts by weight of the millable sulfur vulcanizable ethylenically unsaturated polymeric material. Mixtures of the various cyclohexanes can be used.

The components of the composition are readily mixed together on a 2-roll rubber mill or in a Banbury with the curing agent and accelerators usually being added last. The resulting compounded stocks are then cured in molds or autoclaves, depending on the rubber product desired, for a period of time and at temperatures (usually about 260° to 345° F.) sufficient to cure or vulcanize the composition to the desired degree.

EXAMPLE 14

Natural rubber compositions were compounded, milled and cured using the cyclohexanes as primary and secondary accelerators. These compositions were also compared with a compound using a conventional accelerator, N-cyclohexyl-2-benzothiazole sulfenamide. The rubber composition comprised, all parts being by weight: 100 parts of natural rubber, 50 parts of fine extrusion furnace carbon black, 5 parts of zinc oxide, 2 parts of stearic acid, 3 parts of sulfur and the accelerators as shown below. The compounds were molded and cured for 40 minutes at 300° F. In the table below are shown the results obtained on testing the cured specimens.

| | | | | | |
|---|---|---|---|---|---|
| A (parts by weight) | .9 | .9 | .9 | | |
| B (parts by weight) | | .5 | | 2.0 | |
| C (parts by weight) | | | 5. | | 2.0 |
| Tensile strength, p.s.i. | 3,265 | 3,315 | 3,390 | 3,210 | 3,275 |
| Modulus (300%), p.s.i. | 2,595 | 2,700 | 2,530 | 2,000 | 1,920 |
| Elongation, percent | 380 | 370 | 410 | 450 | 470 |
| Hardness (Shore A) | 64 | 66 | 68 | 61 | 60 |
| Monsanto Rheometer Data (300% F.) | | | | | |
| Cure rate, percent/min | 9.3 | 8.3 | 7.1 | 2.9 | 2.2 |
| Reversion rate, percent/min | .4 | .3 | .6 | .1 | 0 |
| Scorch time, min | 3.0 | 2.2 | .8 | 1.8 | 1.8 |

A: N-cyclohexyl-2-benzothiazolesulfenamide
B: 1,3,5-tris(4-pyridyl)cyclohexane
C: 1,3,5-tris(4-piperidyl)cyclohexane These results show that the cyclohexanes are useful in the curing of unsaturated sulfur curable polymers and provide results comparable to those obtained with other accelerators.

What is claimed is:

1. The method which comprises, at a temperature sufficient to cause trimerization, trimerizing a vinyl pyridine compound having the formula

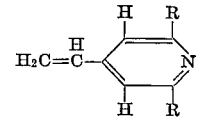

where R is selected from the group consisting of hydrogen and an alkyl radical of from 1 to 4 carbon atoms in admixture with an alkali metal organic imide as a catalyst and a solvent for said pyridine compound, said solvent being selected from the group consisting of a secondary amine and mixtures of a secondary amine and another solvent other than said secondary amine which does not deactivate the catalyst, which is not proton-active, and which does not interfere with nor react with alkali metal or with the alkali metal organic imide, said secondary amine having from 2 to 20 carbon atoms and from 1 to 2 secondary amino nitrogen atoms, to form a trimer having the formula

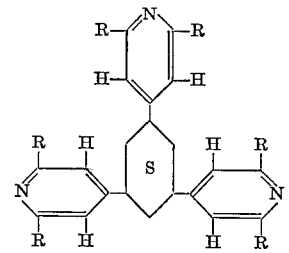

where R is selected from the group consisting of hydrogen and alkyl radicals of from 1 to 4 carbon atoms.

2. The method according to claim 1 in which said alkali metal organic imide is formed by the reaction of at least one material selected from the group consisting of an alkali metal, an alkali metal amide, an alkali metal hydride and an alkali metal hydrocarbon in which the hydrocarbon group has from 1 to 18 carbon atoms and a secondary amine reactive with said material having from 2 to 20 carbon atoms and from 1 to 2 secondary amino nitrogen atoms.

3. The method according to claim 2 in which said alkali metal organic imide is formed in situ in the presence of said solvent and prior to the addition thereto of said vinyl pyridine compound.

4. The method according to claim 2 in which said secondary amine is a cyclic secondary amine having the general formula $$[(CR_2)_{m-n}(X)_n]NH$$

where R is selected from the group consisting of hydrogen and alkyl radicals of from 1 to 4 carbon atoms and mixtures thereof, where X is oxygen or sulfur, where $m$ is a number from 2 to 7, where $n$ is 0 or 1, and when X is 1 there are always at least three $CR_2$ groups present, two of the $CR_2$ groups being attached through the C atom directly to the nitrogen atom.

5. The method according to claim 2 in which said secondary amine is selected from the group consisting of morpholine, piperidine and pyrrolidine and their lower hydrocarbon substituted derivatives.

6. The method which comprises, at a temperature sufficient to cause trimerization, trimerizing a vinyl pyridine compound having the formula

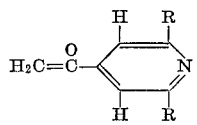

where R is selected from the group consisting of hydrogen and an alkyl radical of from 1 to 4 carbon atoms in admixture with sodium ethylene imide as a catalyst and a solvent for said pyridine compound, said solvent being selected from the group consisting of ethylene imine and mixtures of ethylene imine and another solvent other than said ethylene imine which does not deactivate the catalyst, which is not proton active, and which does not interfere with nor react with the sodium ethylene imide, to form a trimer having the formula

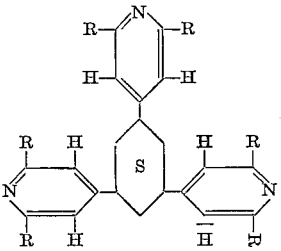

where R is selected from the group consisting of hydrogen and alkyl radicals of from 1 to 4 carbon atoms.

7. A method of producing 1,3,5-tris(4-pyridyl)cyclohexane which comprises forming an admixture of ethylene imine and sodium ethylene imide, adding to said admixture 4-vinylpyridine, and maintaining the resultant admixture at a temperature at which said 4-vinylpyridine reacts to form said 1,3,5-tris(4-pyridyl)cyclohexane.

8. A method as claimed in claim 7 wherein the 4-vinylpyridine is added incrementally.

9. A method as claimed in claim 8 wherein the temperature is maintained at from about 20° to 70° C.

10. A method as claimed in claim 8 wherein the temperature is maintained at about 54° C.

References Cited

UNITED STATES PATENTS 3,338,907  8/1967  Longi et al. _____ 260—290

JOHN D. RANDOLPH, Primary Examiner

A. L. ROTMAN, Assistant Examiner

U.S. Cl. X.R.

260—2, 47, 77.5, 78.5, 79, 79.5, 293.2, 239, 327, 348; 161—184; 117—132, 138.8, 155, 126

PO-1050
(5/69)

UNITED STATES PATENT OFFICE
CERTIFICATE OF CORRECTION

Patent No. 3,528,988          Dated September 15, 1970

Inventor(s) Heinz Uelzmann

It is certified that error appears in the above-identified patent and that said Letters Patent are hereby corrected as shown below:

Column 3, line 7, "wolud" should read -- would --; column 3, line 20, the formula should read --

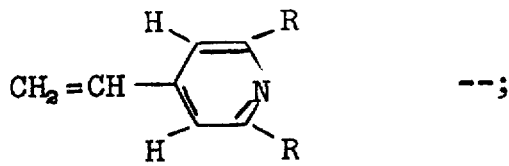   --;

Column 3, lines 25-27, "carbon atoms of the present invention it is preferred to employ single 4-vinyl pyridine compounds rather than mixtures." should read -- carbon atoms and mixtures thereof. In practicing the method of the present invention it is preferred to employ single 4-vinyl pyridine compounds rather than mixtures. --; column 3, line 59, "referred" should read -- preferred --; column 3, line 65, "(boiling point of the solvent" should read -- (boiling point of the solvent) --. Column 4, line 4, "trimerized-vinyl" should read -- trimerized 4-vinyl --; column 4, line 18, "from 1 to carbon atoms" should read -- from 1 to 4 carbon atoms --; column 4, line 29, "1-(4-pyridyl," should read -- 1-(4-pyridyl), --. Column 6, line 4, "inhibtor" should read -- inhibitor --. Column 8, line 24, "1,3,5tris(2,6-dibutyl-4-piperidyl)cyclohexane" should read -- 1,3,5-tris(2,6-dibutyl-4-piperidyl)cyclohexane --; column 8, line 25, insert -- 1-(4-piperidyl) --; column 8, line 25, "3,2,6-dimethyl-4-piperidyl)" should read -- 3-(2,6-dimethyl-4-piperidyl) --. Column 10, line 44, "New ork" should read -- New York --; column 10, line 68, "wtih" should read -- with --. Column 14, line 19, 3rd column, "5." should read -- .5 --. Column 15, line 30,  should read -- 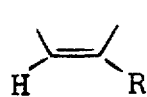 --. Column 16, line 13, "  " should read --   --.

Signed and sealed this 30th day of March 1971.

(SEAL)
Attest:

EDWARD M. FLETCHER, JR.          WILLIAM E. SCHUYLER, JR.
Attesting Officer                Commissioner of Patents